United States Patent [19]

Weiss et al.

[11] Patent Number: 5,162,127
[45] Date of Patent: Nov. 10, 1992

[54] METHOD OF INHIBITING DISCOLORATION OF FOODSTUFFS WITH HYDROLYSIS MIXTURES OF ALDONIC AND SULFITES

[75] Inventors: Carol Weiss, Kirkwood, Mo.; Richard J. Todd, Algonquin, Ill.

[73] Assignee: American National Can Company, Chicago, Ill.

[21] Appl. No.: 809,201

[22] Filed: Dec. 9, 1991

Related U.S. Application Data

[63] Continuation of Ser. No. 683,242, Apr. 10, 1991, abandoned.

[51] Int. Cl.$^5$ .................................................. A23B 7/10
[52] U.S. Cl. ...................................... 426/268; 426/270; 426/335; 426/542; 426/637; 426/654
[58] Field of Search ............... 426/270, 268, 269, 262, 426/335, 541, 542, 532, 637, 654, 106, 321

[56] References Cited

U.S. PATENT DOCUMENTS

| | | | |
|---|---|---|---|
| 2,620,277 | 12/1952 | Scalera | 426/269 |
| 3,056,683 | 10/1962 | Cyr | 426/637 |
| 3,245,799 | 4/1966 | Matz | 426/268 |
| 3,959,501 | 5/1976 | Shatila | 426/269 |
| 3,975,551 | 8/1976 | Shatila | 426/269 |
| 4,097,612 | 6/1978 | Powrie | 426/268 |
| 4,741,911 | 5/1988 | McIntyre | 426/268 |
| 4,789,553 | 12/1988 | McIntyre | 426/268 |
| 4,931,297 | 6/1990 | Malyniak | 426/268 |
| 4,937,085 | 6/1990 | Cherry | 426/321 |
| 4,956,190 | 9/1990 | Chawan | 426/269 |

OTHER PUBLICATIONS

Monograph on Glucono-delta latcone Jun. 2, 1978.
The Use of Glucono-delta Lactone in Bakery Products Oct. 1959 The Baker's Digest.
Chemicals Used in Food Processing 1965 Publ. 1274 1965 Washington DC p. 11.
Furia 1968 Handbook of Food Additives CRC Press Cleveland Ohio pp. 163-169.

*Primary Examiner*—Carolyn Paden
*Attorney, Agent, or Firm*—Wyatt, Gerber, Burke and Badie

[57] ABSTRACT

Foodstuffs subject to oxidative or enyzmatic discoloration particularly fruits, vegetables and cereal grains are treated with a combination of hydrolysis mixtures of aldonic acids and their lactones, particularly gluconic acid and its lactones together with very small quantities of a sulfiting agent in aqueous solutions to assist in maintaining fresh appearance and inhibiting discoloration without detracting from the flavor or leaving residues of sulfites in quantities of public health significance.

20 Claims, 1 Drawing Sheet

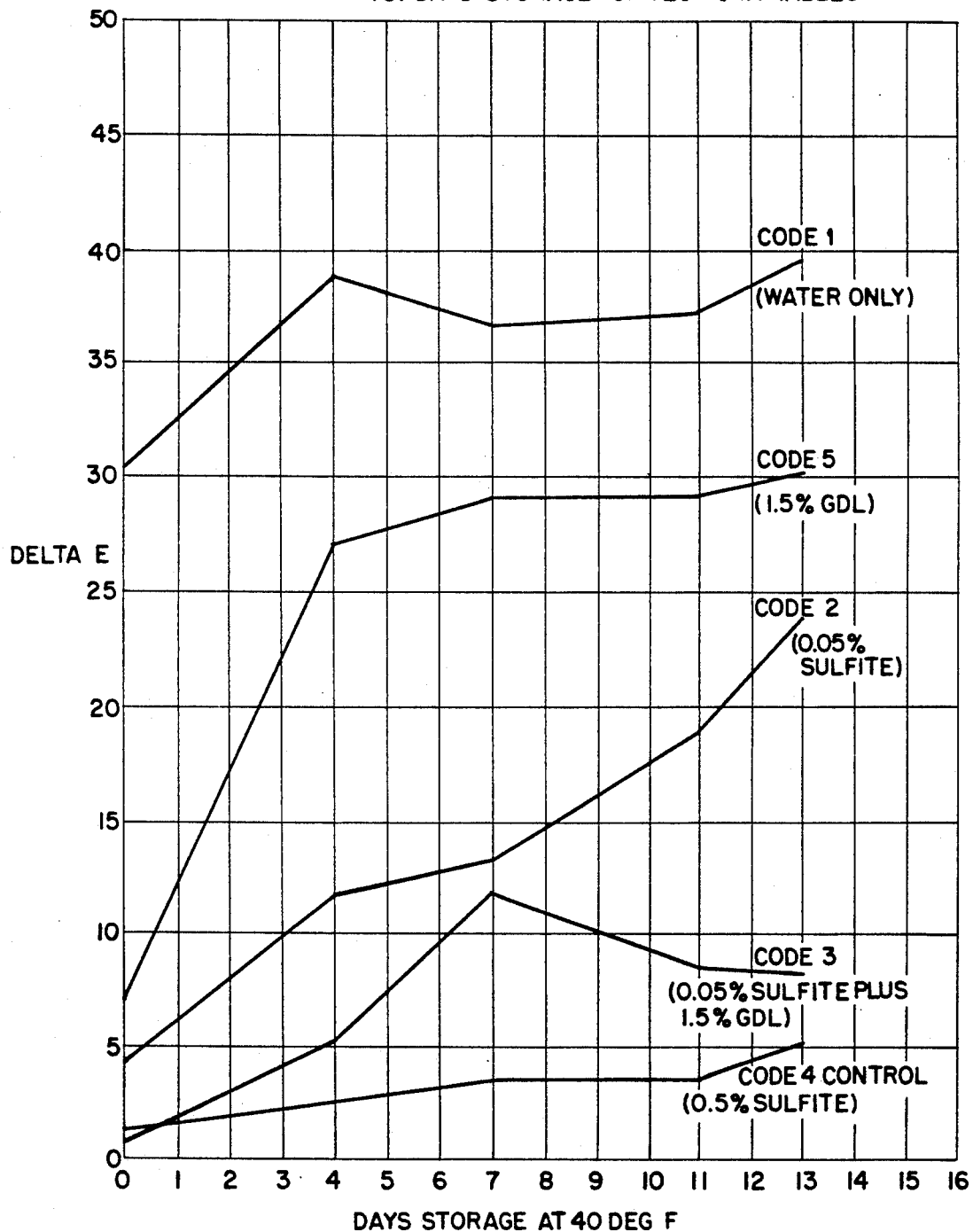

METHOD OF INHIBITING DISCOLORATION OF FOODSTUFFS WITH HYDROLYSIS MIXTURES OF ALDONIC AND SULFITES

CROSS-REFERENCES TO RELATED APPLICATIONS

This application is a continuation of Ser. No. 07/683,242 filed Apr. 10, 1991 which is now abandoned.

BACKGROUND OF THE INVENTION

This invention relates generally to the field of processing foodstuffs particularly fruits, vegetables and cereal grains. More specifically, it relates to processing of such foodstuffs by procedures which include treatment with dilute aqueous solutions of hydrolysis mixtures of aldonic acids and their lactones or precursors thereof, especially gluconic acid, combined with a sulfite to control its appearance by preventing discoloration and/or reversing it by inhibiting enzymatic and/or oxidative discoloration. The acids as will be explained more fully hereinafter normally exist as a mixture of acids and lactones.

From the moment of harvest, food undergoes progressive deterioration and preventive measures are often taken to prolong storage life. Food preservation techniques should retain the nutritional value and prolong the stability of the foods' organoleptic properties. By this is meant those properties or qualities of the foodstuff determinable by use of one or more of the human sense organs. The organoleptic qualities include texture, color, flavor and/or aroma.

One of the most common manifestations of deterioration occurs in certain foodstuffs that are prone to enzymatic and/or oxidative discoloration, such as potatoes. It begins when the cell walls are disrupted when the foodstuff is peeled or its skin is cut, thus exposing them to air without the natural protection of the skin. This initial discoloration is probably exclusively enzymatic in nature. Oxidative discoloration continues after the enzymes have been deactivated by blanching, frying or cooking. With potatoes, the latter type of discoloration appears to be associated principally with oxidation of a ferrous ion complex with o-dihydoxphenols to form a colored complex with the ferric ion.

Numerous agents have been employed in attempts to maintain the natural color of foodstuffs by preventing, retarding, controlling, reversing or otherwise inhibiting the development or retention of discoloration. These have included various acids such as ascorbic, acetic (sometimes in the form of vinegar), citric (sometimes in the form of lemon juice) and malic. However, such acids often impart an acid or sharp flavor to foods with which they are employed. This detracts from the natural flavor of the food. Sodium pyrophosphate is also employed with potatoes for this purpose, but it has an adverse influence on texture, resulting in a mealier product.

Sulfiting agents have been used for hundreds of years in the processing of foods, especially to retard or reverse discoloration. Sulfiting agents which heretofore have been generally regarded as safe include sulfur dioxide, sodium and potassium bisulfite, sodium and potassium metabisulfite and sodium sulfite. Despite the widespread use of sulfiting agents, it has long been recognized that at the concentrations normally employed they impart undesirable flavors and odors which adversely affect the acceptance of foods with which they are used. Recently they have been implicated as initiators of asthmatic attack and other adverse reactions in hyperallergenic individuals. Additionally, the sodium containing agents add to the burden of hypertensive individuals. The Food and Drug Administration of the United States Government has recently imposed strict controls on sulfiting agents for use in connection with potatoes, and other foodstuffs, and a requirement for label declaration of residues of 10 ppm or more for foodstuffs intended to be served or sold to the public.

The limitations or outright banning of sulfiting agents will have a direct impact on food service establishments especially restaurants, supermarkets and salad bars. It is the practice in such food distribution centers to spray the produce with aqueous sulfite solutions to maintain an attractive appearance of freshness by retarding or reversing discoloration. It will also be a problem for food processors and packagers who have long utilized sulfiting agents to inhibit deterioration, especially discoloration of raw foodstuffs or foods such as potatoes, which have been dehydrated, frozen, par-fried, fried, cooked or otherwise processed.

Sulfiting agents have been employed in a wide range of food products which are subject to discoloration including dried fruits, lettuce, potatoes, cauliflower, maraschino cherries, sauerkraut, pickled peppers, corn starch, hominy, fresh mushrooms, soup mixes, crabmeat, pizza and pie dough, fruit salad, grapes and other fruits, vegetables and cereal grains.

SUMMARY OF THE INVENTION

In view of the deficiencies aforesaid, there has been great interest in discovering an agent or agents which can be used to inhibit the deterioration of foodstuffs without detracting from the taste or appearance, and will at the same time be easy to use, inexpensive and non-toxic to humans.

It has now been discovered that deterioration of foodstuffs due to oxidative and/or enzymatic discoloration may be inhibited or reversed by contacting the foodstuff with an effective amount of an aqueous solution of an hydrolysis mixture of an aldonic acid and its lactones or a precursor thereof (hereinafter, for convenience sometimes referred to as aldonic acids) together with small, but effective amounts of a conventional sulfiting agent.

The concentration of sulfiting agents utilized in the novel aldonic acid-sulfiting agent solution of this invention is extremely low, well below the level recently understood to be responsible for the undesirable health manifestations aforesaid. For example, with sodium bisulfite, the most commonly employed sulfiting agent, the amount of sodium bisulfite employed in the practice of the invention is such that its concentration in the aqueous solutions contacted with the foodstuff to be protected is about 0.10%. Typically the amount of sodium bisulfite on a total weight basis that will be picked up by the foodstuff being treated is 0.002%. Not only is this residue well below that believed to be of public health significance, it is also well below that heretofore employed to prevent deterioration of organoleptic properties when sodium bisulfite alone is employed.

If another sulfiting agent, e.g. sulfur dioxide or sodium metabisulfite is employed, the concentration in the aqueous solutions of the invention will be equivalent to those utilized with sodium bisulfite. Of course, equivalent mixtures of other sulfiting agents may also be used.

This invention is applicable to all of the conventionally employed sulfiting agents.

DESCRIPTION OF THE PREFERRED EMBODIMENTS

U.S. patent application Ser. No. 808,400, filed Dec. 12, 1985 is commonly assigned. It describes and claims the use of aqueous compositions containing aldonic acids to inhibit or reverse discoloration of foodstuffs. The concentration employed when aldonic acids are used alone is from 0.05% to 5%. In the compositions of this invention, the amount of aldonic acid employed is from about 0.5% to 2.0% by weight based on the total weight. The preferred range is from 1.0 to 1.5% by weight. These quantities will be used together with 0.01 to 0.1% by weight based on the total weight, preferably 0.05% to 0.1% by weight of sodium bisulfite or an equivalent amount of another sulfiting agent.

Utilization of the compositions of this invention materially extends the shelf life of the treated foodstuff. For example, with peeled and sliced raw potatoes intended for the preparation of french fries at a restaurant, the shelf life of the untreated product is about one hour, if not submerged in water or otherwise protected from oxygen in the air. If the same product is treated with the usual concentration of a sulfiting agent, the shelf life may be up to about 7 to 14 days. If the product is protected in accordance with this invention, the shelf life is extended to about the same as with the usual sulfite treated product but without the dangers associated therewith.

These remarkable result are attained at concentrations of sulfiting agents which are only about 20% of the concentration normally employed. More significantly, the residual sulfite levels are well below those generally accepted as safe by the Food And Drug Administration. Additionally, it avoids the other problems associated with sulfiting agents such as unacceptable odors and flavors.

"Inhibiting", as used in this disclosure means, extending the shelf life of foodstuffs by preventing, retarding or reversing rapid oxidative or enzymatic discoloration.

The word "contacting" is used herein in a broad sense to encompass such treatment as aqueous sprays, dips, washings, blanching, and soaking as well as such treatments as packaging in flexible or rigid containers in brines comprising dilute solutions of the compositions described in this disclosure.

The word "containers" as used herein refers to rigid, semi-rigid and flexible containers and packages whether sealed (hermetically or otherwise) or unsealed. The container may be formed from any of a variety of materials including, for example, paper, fiber, composite, metal (including foil), glass, plastic or combinations thereof. It may be as simple as a cardboard box or a thin plastic film wrapped around a fruit or vegetable, or it may be more complex, such as a bubble pack or a container formed to nest separately each of several fruits or vegetables in one package. The containers may be sealed, for example, by folding, by adhesive, by heat sealing, by double seaming, or with a tie or drawstring.

It has been observed that the advantages of this invention are enhanced if the foodstuff, for example potatoes, after contact with the aldonic acid-sulfiting agent compositions of the invention, or while in contact with the agents, are stored in oxygen barrier containers which most conveniently will be in the form of flexible plastic envelopes which may be heat sealed or sealed with an adhesive. The container may be one-ply or multi-ply, but will be formed with at least one oxygen barrier layer such as a layer of ethylene vinyl alcohol, polyvinylidene chloride, or other known oxygen barrier.

The invention, as will be explained more fully hereinafter, is especially useful with various forms of potatoes. However, it will be employed with a number of common fruits, vegetables and cereal grains which undergo oxidative or enzymatic degradation.

The aldonic acids which can be utilized in accordance with this invention are prepared for example by oxidation of sugars or aldoses, preferably from those having six carbon atoms, although they could be prepared from those having five carbon atoms. Those acids prepared from sugars having six carbon atoms are talonic, galactonic, idonic, gulonic, mannonic, gluconic, altronic and allonic (although currently these acids, with the exception of gluconic, may be unavailable commercially). These acids are respectively derived from their aldoses—talose, galactose, idose, gulose, mannose, glucose, altrose and allose. Sugars having five carbon atoms are lyxose, xylose, arabinose and ribose. Those skilled in the art will understand from this disclosure regarding the six and five carbon atom aldonic acids, that other acids which form their own lactone(s) and mixtures of other acids and their lactones, which perform the same functions and objectives of this invention, particularly regarding controlling or discoloration without causing an objectionable acid taste in the processed food, would be within the scope of this invention.

The sulfites are well known compounds which are commercially available.

Any suitable method or material can be employed to bring the hydrolysis mixture of the aldonic acid and its lactones together with the sulfite into contact with the foodstuff. Gluconic acids are commercially available in technical grade in aqueous solutions. For example, gluconic acid is available in aqueous solutions stated to contain about 50% (by weight) gluconic acid. These aqueous hydrolysis solutions of the acid are equilibrium mixtures of gluconic acid and its lactones, glucono-delta lactone and glucono-gamma lactone.

The preferred method for contacting the hydrolysis mixture of the selected aldonic acid, its lactones and the sulfite to the foodstuff is to dip the foodstuff in the aqueous mixture.

A precursor of the acid herein means a liquid, material or compound which adds the acid to, or forms or provides it in the foodstuff with which it is combined. For example when the aldonic acid or its lactone contacts moisture or water naturally present in the foodstuff, or on its surface, it will hydrolyze to an equilibrium mixture of the acid and its lactones. Precursors of these acids which can be employed include their lactones themselves (which can be said to be latent acids since they hydrolyze in water to form a mixture of the acid and its lactones), mixtures of these lactones, and salts of the acids in combination with certain strong acids. For example, precursors of the preferred gluconic acid which can be employed include glucono-delta-lactone, glucono-gamma lactone, mixtures of these lactones, and gluconate salts in combination with a strong acid, such as hydrochloric. Any of these precursors can be employed to form the equilibrium hydrolysis solutions containing sulfiting agents which are employed in this invention.

By far, the most preferred precursor for this invention is glucono-delta lactone (GDL). It is commercially available in food grade as a free-flowing, odorless, white powder. It has a sweet taste. Food grade solutions of GDL are also commercially available and can be employed. GDL is an inner ester of gluconic acid which when hydrolyzed forms gluconic acid. Hydrolysis occurs when GDL is combined with water, for example that of an (aqueous) brine or in the foodstuff. Hydrolysis of the glucono-delta lactone results in an equilibrium mixture of from about 55% to about 60% (by weight) gluconic acid and from about 45% to about 40% (by weight) of a mixture of glucono-delta lactone and glucono-gamma lactone. The rate of acid formation during hydrolysis is affected by the temperature, the pH value and concentration of the solution. In the absence of heat, hydrolysis tends to be slow. Heating the solution accelerates the hydrolysis reaction, and is the preferred method. Like results will occur with the use of lactones or other aldonic acids, e.g., galactono-delta lactone.

Examples of those salts which can be used in combination with certain strong acids (each suitable for food use), include sodium, potassium and calcium salts, for example, sodium, potassium and calcium gluconates. An example of an acid considered herein to be "strong" is one which will react with the acid salt and provide enough available hydrogen ions to form the desired aldonic acid and its lactones in the foodstuff. Such an acid would be hydrochloric. Of course, the type, manner and/or amount of strong acid(s) employed should be such that in accordance with the objectives of this invention, a sharp, strong or objectionable acid taste is not imparted to the foodstuff.

The following table shows equivalent weights of some of the common sulfiting agents in aqueous solution based on total weight.

TABLE 1

| SULFITING AGENT | CONCENTRATION BY WEIGHT |
|---|---|
| Sodium Bisulfite | 0.10% |
| Sodium Sulfite | 0.12% |
| Potassium Bisulfite | 0.12% |
| Sodium Meta Bisulfite | 0.09% |
| Potassium Meta Bisulfite | 0.11% |
| Sulfur Dioxide | 0.06% |

Other components normally employed in treating foodstuffs may be incorporated in the aqueous compositions of this invention. These include salt, sugar, phosphates, ethylene diamine tetraacetic acid and various calcium salts. It may also be convenient to add antimicrobial agents such as benzoates, sorbates, or chlorine dioxide to inhibit microbial decomposition of the foodstuff. The preferred antimicrobial agent is potassium sorbate and it will be used at a level of about 0.002 percent by weight based on the total weight.

Treatment with the processing medium of the invention may be effected promptly after harvesting or before, during or after any of the routine food processing techniques such as washing, peeling, slicing, cutting, blanching, dehydrating, freezing, cooking (e.g., par-frying, frying and partial cooking) irradiating or packaging. There may be one treatment or several treatments before the food reaches the consumer. As aforesaid, the food may be packaged in a container in a brine of the acid-lactone-sulfite mixture.

It is preferred to contact the foodstuff with the selected acid/lactone/sulfite promptly after the foodstuff has been peeled, cut, sliced or otherwise treated so that its cells are exposed to the atmosphere. The reason is that such treatment may sometimes be effective to reverse discoloration or to prevent or inhibit discoloration through the subsequent processing steps. The further the discoloration has progressed, the more difficult it is to reverse it. Thus, with potatoes, it is preferred to treat the freshly peeled potato, most advantageously, as soon after peeling or cutting as possible.

Many foods, particularly potatoes, may undergo several processing steps before they are ready for the consumer. These may include, for example; slicing, dehydrating, flaking, whipping and mashing. In each of these steps, the physical form of the potato is changed, the surface area is increased, and more cells are injured and exposed to the atmosphere. It is, therefore, sometimes advisable to treat the thus altered foodstuff with an agent of the invention at more than one of the processing steps subsequent to the initial treatment.

The specific amount of the mixture of the aldonic acids, their lactones, and sulfite, which when applied to the foodstuff will be effective to achieve the advantages of the invention with a specific foodstuff substrate will vary appreciably in accordance with factors well understood by those skilled in the art including size; exposed surface area; time of treatment; the specific foodstuff, e.g., its density and buffering capacity, the length of time it is to be protected and the environment to which it will be exposed. Generally, it is sufficient to lightly coat the foodstuff with the active solution, for example, by dipping. However, for some foodstuffs or applications, longer exposure may be necessary, for example by soaking the foodstuff or packaging it in a brine containing the mixture.

The processing is normally conducted at ambient temperature, i.e., about 50° to 70° F. However, higher temperatures, i.e. above 110° F. and even as high as 180° F. or higher may be employed. The higher temperatures have generally been found useful to reverse discoloration in potatoes.

This invention is of particular importance to the potato industry. Discoloration of freshly peeled or cut raw potatoes results from enzymatic oxidation in injured cells when they are exposed to air. This darkening of the raw tubers is believed to be due to enzymatic oxidation of tyrosine to melamine. Discoloration after cooking is also a problem. It is generally accepted that such darkening is due to the formation of a dark colored complex formed between o-dihydroxyphenols and ferric iron. The complex is formed by air oxidation of the corresponding ferrous iron complex normally present in potatoes. Heretofore, the art has sought to deal with the problem utilizing antioxidants or with various sulfiting agents. These agents have been unsatisfactory for reasons discussed above.

It has been found that the process of this invention is useful in maintaining color by preventing or retarding discoloration of potatoes in all commercial forms of the product. Potatoes and processed potatoes appear in the marketplace in many different forms. This invention is useful in the preparation of any or all such processed products. The principal commercial potato products are frozen, dehydrated, cooked, sliced, diced, par-fried, french fried, and home fried potatoes as well as potato chips. The process of the invention is especially valuable for the preparation of these products, as well as canned products containing potatoes, for example, stews, hashes, soups, potato salads, etc.

The novel methods of this invention will be employed to produce novel foodstuffs characterized by the presence of selected quantities of an hydrolysis mixture of aldonic acids, their lactones or precursors thereof together with one or more sulfiting agent. Such foodstuffs may be said to "contain" the acids, lactones and sulfites, although the methods of containment may vary. The foodstuffs may contain the acid-lactone-sulfite mixture because the foodstuff is packaged in a brine of the mixture. They may also contain the mixture because the liquid carrier of the mixture has evaporated, leaving a surface deposit of the mixture. With porous foodstuffs, a foodstuff may contain the mixture because the acid, lactones and sulfites have actually been absorbed into the body of the foodstuff.

What has been described is a novel method of preventing or inhibiting discoloration of foodstuffs subject to oxidative or enzymatic discoloration by contacting the foodstuff with an aqueous solution containing selected amounts of an hydrolysis mixture of an aldonic acid and its lactones or a precursor thereof together with one or more sulfiting agent. The method is characterized by the fact that the amount of sulfiting agents is considerably less than normally employed with the result that the residue contained by the treated foodstuff is so low that it is not of public health significance.

The method employs novel aqueous compositions containing from 0.5 to 2.0% by weight based on the total weight of an hydrolysis mixture of a aldonic acid and its lactones or a precursor thereof together with from 0.01 to 0.1% preferably 0.05 to 0.1% by weight based on the total weight of sodium bisulfite or equivalent sulfiting agent. The treated foodstuffs may be provided in any of a wide variety of containers. The preferred containers are those which are substantially impervious to oxygen.

Table 2 below summarizes a number of experiments which were conducted with "french fry" cut potatoes in various dip solutions. Dip exposure times, and concentrations of the dip components were varied for these experiments. The dips consisted of different concentrations of sodium bisulfite and an hydrolysis mixture of gluconic acid and its lactones (GDL).

Dip solutions containing 0.5% sodium bisulfite were included as controls, representing commercial practice prior to sulfite restriction laws. While this concentration results in the best color retention, it results in residual sulfite retention >200 ppm (as $SO_2$), which is of concern to the regulatory agencies and sulfite sensitive individuals.

Dip solutions containing only 0.05% sodium bisulfite do not yield adequate color retention of potato products nor do dip solutions containing only hydrolysis mixtures of gluconic acid and its lactones (GDL) without sulfites.

However, when solutions containing a combination of 0.05% sodium bisulfite and a hydrolysis mixture of gluconic acid and its lactones (GDL) are used as a dip treatment, the resulting product maintains adequate color retention and yet the sulfite retention is less than 10 ppm ($SO_2$), an order of magnitude less than the commercial (control) practice. In fact, even when the combination contained 1.5% GDL and 0.10% sodium busulfite, the sulfite retention was only 13 ppm (as $SO_2$). In every set of tests the product appearance after treatment with a dip solution containing a combination of sulfite/GDL solution, was much better in visual appearance, especially color, after several days than the controls.

FIG. 1 graphically illustrates the results when products of Examples 1 through 5 were measured for color. Instrumentation which measures colorimetry over time was used according to well established procedures. Total color difference (delta E) values are plotted vs. time in FIG. 1. Delta E is a measurement of the change in color of the test composition from the color of a freshly cut potato. A delta E value of 3 or larger is regarded by the industry as a "perceptible" color difference. As can be seen, the greatest product deterioration as indicated by color, occurs when untreated water is employed as the dip. The least change occurs with the 0.5% sulfite control. The combination of 0.05% sulfite and 1.5% GDL results in much better color control than either 0.05% sulfite or 1.5% GDL alone. The colorimetry curve of the combination follows more closely the curve of the 0.5% sulfite control, and without the high (>200 ppm as $SO_2$) sulfite residuals retained by the sulfite control. In fact, the results of the combination were much better than would have been predicted from an examination of the results with each component alone.

For each test, Idaho Russet potatoes were tumbled for 60 seconds in a Hobart Abrasion peeler which removed most of the skin. Surface bruises and the remaining skin were removed with a hand peeler.

The potatoes were transferred under water, minimizing exposured to air, to a Hobart slicer where they were cut into ⅜ inch french fries. These were transferred to a dipping basket and soaked for the specified dipping times in the various test solutions. Excess water was shaken off and 650±2 g of fries were weighed into 2.7 mil polyethylene bags (10 9/16×11 inches). The bags were sealed by a "zip-lock" feature and stored under fluorescent lights at 40° F. The potatoes dipped in water only began discoloring noticeably within two hours in all tests thus verifying that the potatoes would discolor under the conditions of the test.

TABLE 2

| CONCENTRATION OF COMPONENTS IN DIP SOLUTIONS | | | |
| --- | --- | --- | --- |
| Example | Dip Time | NaHSO$_3$ | GDL |
| 1 | 3 min. | 0% | 0% |
| 2 | 3 min. | 0.05% | 0% |
| 3 | 3 min. | 0.05% | 1.5% |
| 4 | 3 min. | 0.5% | 0% |
| 5 | 3 min. | 0% | 1.5% |
| 6 | 3 min. | 0.05% | 1.75% |
| 7 | 3 min. | 0.05% | 2.0% |
| 8 | 6 min. | 0% | 0% |
| 9 | 6 min. | 0.5% | 0% |
| 10 | 6 min. | 0.05% | 1.5% |
| 11 | 6 min. | 0.05% | 1.0% |
| 12 | 6 min. | 0.05% | 0.5% |
| 13 | 4 min. | 0.5% | 0% |
| 14 | 4 min. | 0.05% | 1.5% |
| 15 | 4 min. | 0.05% | 1.0% |
| 16 | 4 min. | 0.05% | 0.5% |
| 17 | 2 min. | 0.5% | 0% |
| 18 | 2 min. | 0.05% | 1.5% |
| 19 | 2 min. | 0.05% | 1.0% |
| 20 | 2 min. | 0.05% | 0.5% |
| 21 | 3 min. | 0.05% | 1.0 |
| 22 | 3 min. | 0.03% | 1.0% |
| 23 | 3 min. | 0.01% | 1.0% |

What is claimed is:

1. A one step method of preventing, retarding or reversing rapid oxidative or enzymatic discoloration of foodstuffs subject to rapid oxidative or enzymatic degradation which comprises contacting the food with a solution containing from about 0.5 to 2.0% by weight of an hydrolysis mixture of an aldonic acid and its lactones or a precursor thereof together with from about 0.01 to 0.1% by weight of sodium bisulfite or an equivalent amount of another sulfiting agent.

2. A method as in claim 1 wherein the aldonic acid is gluconic acid.

3. A method according to claim 2 wherein the foodstuff is selected from the group consisting of vegetables, fruits and cereal grains.

4. A method according to claim 2 wherein the foodstuff is potato.

5. A method according to claim 4 wherein contact with the potato is effected with freshly peeled potato.

6. A method according to claim 4 wherein the potato is processed potato selected from the group consisting of frozen, dehydrated, cooked, sliced, cut, diced, par fried, french fried, and home fried potatoes and potato chips, and contact is effected at least one of the steps in the production of the processed potato.

7. The method of claims 1 or 2 wherein the sulfite is sodium bisulfite.

8. The method of claims 1 or 2 wherein the sulfite is sodium sulfite.

9. The method of claims 1 or 2 wherein the sulfite is potassium bisulfite.

10. The method of claims 1 or 2 wherein the sulfite is sodium meta bisulfite.

11. The method of claims 1 or 2 wherein the sulfite is potassium meta bisulfite.

12. The method of claims 1 or 2 wherein the sulfite is sulfur dioxide.

13. A foodstuff subject to rapid oxidative or enzymatic degradation and resulting discoloration, said foodstuff having been subjected to one step method for preventing, retarding or reversing such discoloration by contact with a composition containing from about 0.5 to 2.0% by weight of an hydrolysis mixture of an aldonic acid and its lactones or a precursor thereof together with from about 0.01 to 0.1% by weight of sodium bisulfite or an equivalent amount of another sulfiting agent.

14. A foodstuff according to claim 13 wherein the aldonic acid is gluconic acid.

15. A foodstuff according to claim 14 wherein the foodstuff is selected from the group consisting of vegetables, fruits and cereal grains.

16. A foodstuff according to claim 14 wherein the foodstuff is potato.

17. A foodstuff according to claim 16 wherein the potato was freshly peeled when it was contacted.

18. A foodstuff according to claim 16 wherein the potato is processed potato selected from the group consisting of frozen, dehydrated, cooked, sliced, cut, diced, par fried, french fried, and home fried potatoes and potato chips.

19. A foodstuff according to claims 13, 14, 15, 16, 17 or 18 in a container.

20. A foodstuff according to claims 13, 14, 15, 16, 17 or 18 in an oxygen barrier container.

* * * * *